United States Patent

Schmitt et al.

[11] 3,919,218
[45] Nov. 11, 1975

[54] STABLE POLYISOCYANATES AND PROCESS THEREFOR

[75] Inventors: Karl Schmitt; Josef Disteldorf, both of Herne; Felix Schmitt, Herten-Langenbochum, all of Germany

[73] Assignee: Veba Chemie AG, Gelsenkirchen-Buer, Germany

[22] Filed: May 20, 1974

[21] Appl. No.: 471,723

[30] Foreign Application Priority Data
May 22, 1973 Germany.......................... 2325826

[52] U.S. Cl................ 260/248 NS; 260/77.5 AC; 260/77.5 SS
[51] Int. Cl.$^2$.................................. C07D 251/04
[58] Field of Search............................. 260/248 NS

[56] References Cited
UNITED STATES PATENTS

| | | | |
|---|---|---|---|
| 3,487,080 | 12/1969 | Matsui et al. | 260/248 |
| 3,517,002 | 6/1970 | Heiss | 260/248 |
| 3,641,024 | 2/1972 | Argabright et al. | 260/248 |
| 3,817,937 | 6/1974 | Argabright et al. | 260/248 |

*Primary Examiner*—John M. Ford
*Attorney, Agent, or Firm*—Burgess, Dinklage & Sprung

[57] ABSTRACT

Isocyanato isocyanurate solutions are prepared by the trimerization of aliphatic or cycloaliphatic isocyanates with aziridine or its derivatives as catalyst and trialkylamines with 1–5 carbon atoms in the alkyl groups as co-catalyst in the presence or absence of organic solvents and terminating the polymerization by destroying said catalyst by thermic treatment at temperatures between 80° and 200°C, and simultaneously or subsequently separating said co-catalyst by distillation.

Isocyanato isocyanurates having the formula

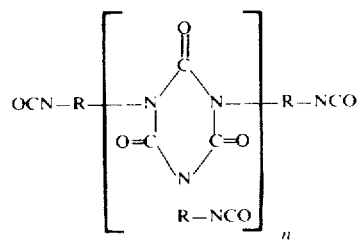

wherein R is

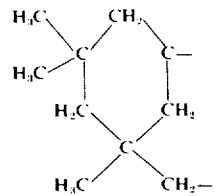

or

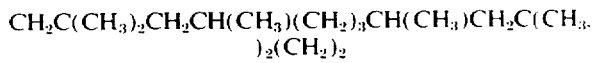

and $n$ is an integer, preferably 1–5.

5 Claims, No Drawings

STABLE POLYISOCYANATES AND PROCESS THEREFOR

BACKGROUND

Isocyanuric acid derivatives are currently used very widely in the plastics industry. They are characterized by high thermic stability and also, in the case of a specific chemical structure, by excellent flame resistance. In order to build up the isocyanuric acid ring, organic isocyanates are frequently used as raw materials and are subjected to catalytic polymerization. For this purpose mainly aromatic isocyanates are used which can be transformed relatively easily into the trimerous form of the isocyanurate. Many different catalysts are known for this reaction. The trimerisation of aliphatic and cyclo-aliphatic isocyanates on the other hand does not take plate so simply; for this group of substances, higher concentrations of catalysts or higher temperatures are frequently required.

If organic diisocyanates are used as raw material for the trimerisation and if the polymerization is interrupted at a specific stage, then soluble polyisocyanates are obtained which by virtue of their polyfunctionality and the related rapid cross-linkage with resins comprising hydroxyl groups, have proved successful as isocyanate cross-linking agents for rapid drying polyurethane lacquers. According to the current state of the art, the only products used are those which are based completely or for the greater part on aromatic diisocyanates. The said polyisocyanates suffer from the defect of poor UV stability. Furthermore, it is the state of the art that the polymerization is broken off by the destruction of the basic catalysts with acids or acid chlorides.

With this mode of stabilization a fedinite coloration of the isocyanurate solution occurs, and the frequently undesirable salts are left behind in the polyisocyanate solution.

SUMMARY

It has now been discovered unexpectedly that the disadvantages mentioned do not arise when aliphatic or cycloaliphatic isocyanates are subjected to the polymerisation into isocyanurates with the use of selected catalysts and co-catalysts and the said specific catalyst systems are destroyed by the effect of high temperature or removed distillatively. For instance, it has been found that aziridine or its derivative as catalyst lose their activity when they are exposed for short times to increased temperatures of 80°-200°C. Since aziridine and aziridine derivatives, and more particularly the reaction products with isocyanate, i.e., the correspondingly substituted ethyleneureas, are however only sufficiently active in the presence of a co-catalyst, more particularly trialkylamines the co-catalyst has to be removed distillatively after the desired degree of oligomerization has been attained. This is advantageously done during the thermic destruction of the aziridine derivatives. In contra-distinction to the customary method of destroying the catalysts by means of acids and acid chlorides, this produces practically no further discoloration.

The object of this invention is a method of manufacturing isocyanato-isocyanurate solutions stable in storage by the trimerization of aliphatic or cycloaliphatic isocyanates with aziridine or its derivatives as catalyst and trialkylamines with 1-5 carbon atoms in the alkyl groups as co-catalyst in the presence or absence of organic solvents, which is characterized by the fact that in order to terminate the polymerization the catalyst is destroyed by thermic treatment at temperatures between 80° and 200°C, preferably between 100° and 180°C, and the co-catalyst is simultaneously or subsequently separated distillatively.

Isocyanato-isocyanurates of the following structure are a further object of this invention:

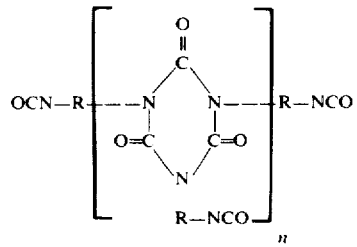

wherein R is

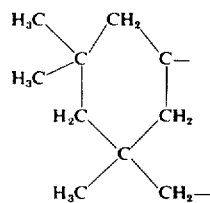

or

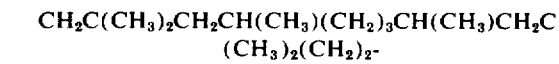

and $n$ is an integer, preferably 1-5.

DESCRIPTION

The mono- and di-ethyleneureas of the trimerizene diisocyanates have been found an effective substance from the range of the substituted aziridines, while it is advantageous to synthesize them by reaction of aziridine with the isocyanate to be trimerized during the process. The strongly basic trialkylamines with alkyl groups of $C_1$-$C_5$ atoms, which may be the same or different, may be considered as co-catalysts for the trimerization of the aliphatic and cycloaliphatic isocyanates, which are difficult to trimerize.

In order to manufacture polyisocyanates as isocyanate cross-linking agents in polyurethane chemistry, the raw materials used are as already mentioned, diisocyanates, while for yellowing-free, weather resistant systems, e.g., two-component polyurethane lacquers, according to the invention, only aliphatic or cycloaliphatic diisocyanates can be used. As aliphatic diisocyanates, substituted and non-substituted compounds with a carbon number of $C_4$-$C_{18}$ are suitable, e.g., trimethylhexamethylene diisocyanate. Particular preference is given here according to the invention to diisocyanates with different reactive isocyanate groups, such as for example 3-isocyanatomethyl-3,5,5-trimethylcyclohexylisocyanate (IPDI). The differntial reactivity makes possible a selective building up of the isocyanurates with the advantages of good control of the course of the reaction, low viscosity position of the end products and small monomer fractions.

In order to manufacture soluble isocyanato-isocyanurates, the isocyanate to be trimerized is batched, the catalyst and the co-catalyst are added, generally less than 1 weight percent each, and the mixture is heated to a temperature between 25° and 100°C, preferably to a temperature between 40° and 70°C. After an incubation period of 1–5 hours, the exothermic reaction commences, so that the mixture heats up within a few minutes to 80–100°C. After this temperature has been reached, the temperature of approximately 80–100%C is maintained by a dosed addition of the desired solvents, generally 20–50 weight percent of the total batch, and optionally even cooled as the reaction progresses. In this way a not unduly stormy course of the reaction is obtained. Depending upon the size of the batch, the temperature falls again slowly after 30–120 minutes and the trimerization then continues to progress only slowly. As a rule the —NCO content has fallen after 24 hours to approximately 40–50% of the initial value.

The isocyanato-isocyanurate containing solvent is now subjected to thermic stabilization. For this purpose, however, the following conditions must be taken into account in the choice of the co-catalyst and of the solvents: boiling point of the co-catalyst (e.g., trialkylamine) should be below the boiling point of the lowest boiling solvent. The solvents should be chosen so that during the distillative separation of the co-catalyst using an active column the temperature in the sump adjusts higher than 100°C, preferably to 100–180°C. Suitable solvents are aromatics, e.g., toluene, xylene, ketones, e.g., methylisobutyl ketone, dibutyl ketone, esters, ethylglycolacetate, butylacetate, etc. Furthermore, the initial isocyanate may also be used as a solvent.

If the solution of the isocyanato-isocyanurate is heated to boiling point and fractionated through an effective column, then the co-catalyst is largely removed from the reaction mixture. For this purpose it is sufficient to drive off small fractions (1–5%) of the reaction mixture. Without taking the losses into account, between 60–80% of the quantity of co-catalyst used can be detected titrimetically in the distillate. Under the thermic stress during the distillation, the catalytic activity of the aziridine ring is also lost, so that by these means solutions of the isocyanato-isocyanurate which are stable in storage are obtained without further treatment. If the initial isocyanate is used as solvent, then the distillative processing using a thin layer evaporator is recommended.

EXAMPLE 1

Description of the method claimed 3000 g 3-isocyanatomethyl-3,5,5-trimethylcyclohexyl-isocyanate (IPDI) and 22.5 g triethylamine are mixed in a glass flask and heated to 60°C. 75 g of a 20% solution of aziridine in benzene (80°–100°C) are now dripped in while stirring. After 1.5 hours, the rising temperature of the reaction mixture indicates the commencement of trimerization.

After a temperature of approximately 100°C has been attained, 1333 g of toluene and 667 g of ethylglycolacetate (EGA) are slowly added so that the temperature does not exceed 100°C. After a further 1.5 hours the temperature has again decreased to 60°C. The —NCO content of the solution at this time has diminished to 12.7%. In order to further accelerate the isocyanurate formation, 37.6 g of the 20% aziridine solution are again added. After approximately 12 hours total reaction time, the solution has an —NCO content of 9.1%.

In order to transform the reaction mixture into an isocyanato-isocyanurate solution stable in storage, 386 g of the reaction mixture is separated within 90 minutes through an effective column. The sump temperature during this stage of the process is 120°–132°C. 68% of the triethylamine used can be detected in the distillate.

| Analytic data of the isocyanurate solution: | |
|---|---|
| NCO content | 9.8% |
| Content of monomerous IPDI | 3.1% |
| Color | Yellow-Clear |
| Tinting strength value (Gardner) | 4 |
| Viscosity at 25°C | 406 cSt |

EXAMPLE 2

Comparison of the catalytic action of various aziridine derivatives

Method:

1 val isophorondiisocyanate (IPDI) (111g) and 60 g solvent mixture ethylglycolacetate (hereinbelow called EGA)/ toluene = 1 : 2 are supplied and 0.02 val aziridine or derivatives of aziridine and also 0.01 val of triethylamine are dissolved in this reaction mixture. The reaction mixture is then heated to 60°C.

| Experiment I Catalyst mixture | 0.02 val (0.86g) aziridine 0.01 val (1.01g) triethyl amine (hereinbelow called TEA) |
|---|---|
| Experiment II Catalyst mixture | 0.02 val (3.4g) 1-(N-ethyleneureido)-3-(N-ethyleneureidomethylene)-3,5,5-trimethylcyclohexane 0.01 val (1.01g) TEA |
| Experiment III Catalyst mixture | 0.02 val (1.74g) 1-(2-hydroxyethyl)-aziridine 0.01 val (1.01g) TEA |
| Experiment IV Catalyst mixture | 0.02 val (3.87g) 3-aziridinyl-1'-propionic acid methylester |

Course of trimerization:

| | NCO content of the solution after...hours | | |
|---|---|---|---|
| | 0 Hours | 4 Hours | 20 Hours |
| Experiment I | approx. 24% | 11.55% | 8.7% |
| Experiment II | approx. 24% | 23.0 % | 9.3% |
| Experiment III | approx. 24% | 23.0 % | 21.4% |
| Experiment IV | approx. 24% | 22.8 % | 22.8% |

EXAMPLE 3

3000 g IPDI are mixed with 1616 g ethylglycolacetate. At room temperature, 15 g 1,4-diaza-bycyclo-2,2,2-octane are dissolved in this mixture and then heated to 40°C. After a temperature of 40°C has developed, 50 g of a 20% solution of ethyleneimine in benzene (boiling limits: 80°–110°C) is dripped in. After approximately 1 hour the commencement of trimerization is registered by the increase in temperature of the reaction mixture. By cooling by means of an ice/water mixture, a part of the heat of the reaction is dissipated, so that the solution heats up to a maximum of 110°C. After the temperature has fallen again to 40°C, 50 g of the ethyleneimine solution is once more added, and the mixture is then cooled to room temperature. After approximately 20 hours total duration of the experiment, an —NCO content in the solution of approximately 10% is found.

EXAMPLE 4

650 g IPDI are mixed with 350 g ethylglycolacetate and with 10 g tributylamine. The mixture is heated to 60°C and 30 g of 20% solution of ethyleneimine in benzene is added. After approximately 4 hours the temperature of the mixture rises to 90°C and then falls again within 1 hour to approximately 60°C. The —NCO content is then 13.5%. This solution is left for a further 16 hours at room temperature in order to complete the oligomerization. An —NCO content of 11.2% has the developed.

EXAMPLE 5

Study of stability in storage 200 g isophoronediisocyanate are mixed with 10 g triethylamine and heated to 60°C. After this temperature has been reached, 33 g of a 20% solution of ethyleneimine in toluene are dripped slowly into the reaction mixture while stirring vigorously.

After approximately 3.5 hours the temperature in the reaction mixture rises due to the commencement of the exothermic trimerization. 1333 g of solvent mixture (toluene/EGA = 1 : 1) are now added. After approximately 15 minutes a maximum temperature of 87°C is reached. The reaction decays slowly so that after a further 1.5 hours a temperature of 60°C has again developed. The triisocyanato-isocyanurate solution is maintained for a further 15 hours at 60°C and in this way a solution with an —NCO content of 10.6% is obtained.

The solution is now divided into three parts. The first part, solution A, receives no after treatment, the second part, solution B, is heated for approximately 60 minutes to 120°C. The third part, solution C, is concentrated by distillative separation of 5% solvent and of the principal fraction of triethylamine to a solid content of 65%.

TABLE 1

| Study of the Stability | | | | | |
|---|---|---|---|---|---|
| Solution A NCO Content % | Viscosity at 25°C cSt | Solution B NCO content % | Viscosity at 25°C cSt | Solution C NCO content % | Viscosity at 25°C cSt |
| Initial Values | | | | | |
| 10.6 | 61 | 10.6 | 61 | 11.5 | 190 |
| After 1 month | | | | | |
| 10.2 | 70 | 10.5 | 65 | 11.5 | 194 |
| After 3 months | | | | | |
| 9.5 | 191 | 10.3 | 88 | 11.5 | 198 |
| After 4 months | | | | | |
| 9.1 | 345 | 10.1 | 105 | 11.5 | 201 |

EXAMPLE 6

Influence of the stabilization upon the color of the isocyanurate solution 3000 g isophoronediisocyanate are mixed with 22.5 triethylamine and 15 g ethylenimine and heated to 60°C. After 5 hours the trimerization commences with evolution of heat. After the temperature has attained approximately 95°C, 2000 g solvent mixture (EGA/toluene = 1 : 3) are added in such a manner that the reaction temperature does not exceed 105°C. After adding the total quantity of solvent, the temperature falls again within 1 hour to 60°C. After approximately 20 hours, an —NCO content of approximately 11% is found.

The yellowish colored triisocyanato-isocyanurate solution is now divided into four parts.

Solution I, to provide a control, is left without further treatment. Solution II is subjected to a thermic treatment for 1.5 hours at 120°C. From Solution III, 5% of the solvent mixture and the principal fraction of the triethylamine are removed distillatively through a column. The sump temperature during this operation is approximately 130°C. For the purposes of comparison the solution thus stabilized is then diluted again with toluene to 60% solid content. Solution IV, after adding the quantities of benzoyl chloride equivalent to the catalyst (method according to the prior art) is stabilized for approximately 2 hours at 60°C.

TABLE II

| Description of the Solutions After Stabilization | | | |
|---|---|---|---|
| | NCO content* | Viscosity at 25°C | Appearance | Tinting strength Value (Gardner) |
| Solution II | 11.2% | 32 cSt | Yellow | 4 |
| Solution III (INV) | 11.6% | 32 cSt | Yellow | 4 |
| Solution IV | 12.4% | 29 cSt | Yellow reddish-brown | 11 |
| Compared to untreated solution I. | 11.1% | 28 | Yellow | 4 |

*Different NCO contents result from the detection of the catalysts and of the benzoyl chloride during the analysis.

EXAMPLE 7

3000 g of a diisocyanate, consisting of a mixture of isomers of 2,2,4- and 2,4,4-trimethylhexamethylenediisocyanate in the proportion of approximately 40 : 60, are mixed with 22.5 g triethylamine and 15 g aziridine and heated to 70°C. After 1.5 hours, the rise in temperature indicates the commencement of trimerization. After the reaction mixture has reached approximately 100°C, 1616 g of a solvent mixture comprising butylacetate/toluene = 1 : 3 are added. The temperature now falls in the course of 1 hour back down to 65°C. The —NCO content at this time is around 15.0%. After a further 10 hours reaction time at 65°C, the content of free —NCO groups has falled to 12.7%. 384 g of a benzene fraction (boiling limit: 80°–110°C) are now added and the solution is stabilized by distillative processing in the manner described in Example 1.

The resulting pale yellow polyisocyanate solution has a viscosity at 25°C of 75 cP and an —NCO content of 12.65%. Storage stability studies and tinting strength value comparisons yielded substantilly the same results as shown in Examples 5 and 6.

What is claimed is:

1. Method for preparing stable isocyanato isocyanurate which comprises trimerizing alkyl or cycloalkyl isocyanates having 4–18 carbon atoms with aziridine or substituted aziridines as catalyst and trialkylamines with 1–5 carbon atoms in the alkyl groups as co-catalyst and terminating the polymerization by destroying said catalyst by thermic treatment at temperatures between 80° and 200°C, and simultaneously or subsequently separating said co-catalyst by distillation.

2. Method of claim 1 carried out in the presence of an organic solvent.

3. Method of claim 1 wherein the isocyanate is trimethylhexamethylene diisocyanate.
4. Method of claim 1 wherein the isocyanate is 3-isocyanatomethyl-3,5,5-trimethylcyclohexylisocyanate.
5. Isocyanato isocyanurate having the formula:
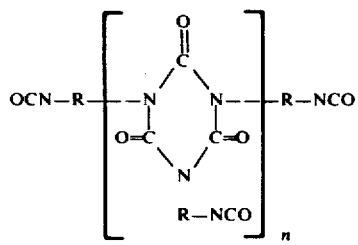
wherein R is
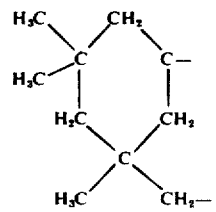
or
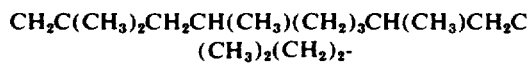
and $n$ is an integer, preferably 1–5.
* * * * *

UNITED STATES PATENT OFFICE
CERTIFICATE OF CORRECTION

Patent No. 3,919,218                Dated   November 11, 1975

Inventor(s)  Schmitt et al

It is certified that error appears in the above-identified patent and that said Letters Patent are hereby corrected as shown below:

Column 4, Line 45          Insert
Experiment IV
                           --0.01 val (1.01g) TEA--.

Signed and Sealed this twenty-fifth Day of May 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,919,218
DATED      : November 11, 1975
INVENTOR(S): Schmitt et al It is certified that error appears in the above-identified patent and that said Letters Patent are hereby corrected as shown below:

Title Page, in the "ABSTRACT":

Column 2, lines 15-18; and

Column 7, lines 15-18;     In the Formula

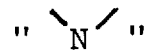

R-NCO should be

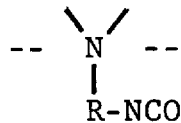

Signed and Sealed this

Twenty-fifth Day of September 1979

[SEAL]

Attest:

LUTRELLE F. PARKER
*Attesting Officer*  *Acting Commissioner of Patents and Trademarks*